US010066102B2

(12) United States Patent
Lakeman et al.

(10) Patent No.: US 10,066,102 B2
(45) Date of Patent: Sep. 4, 2018

(54) POLYCARBONATE CONTAINING COMPOSITIONS

(71) Applicant: TRINSEO EUROPE GMBH, Horgen (CH)

(72) Inventors: Pascal E. R. E. J. Lakeman, Breda (NL); Peter De Winde, Breskens (NL); Cheryl Weckle, Midland, MI (US)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 15/617,310

(22) Filed: Jun. 8, 2017

(65) Prior Publication Data

US 2017/0267860 A1 Sep. 21, 2017

Related U.S. Application Data

(63) Continuation of application No. 15/037,775, filed as application No. PCT/EP2013/074456 on Nov. 22, 2013, now Pat. No. 9,708,488.

(51) Int. Cl.
*C08K 5/16* (2006.01)
*C08L 69/00* (2006.01)

(52) U.S. Cl.
CPC ........... *C08L 69/00* (2013.01); *C08L 2201/08* (2013.01); *C08L 2205/03* (2013.01); *C08L 2205/08* (2013.01)

(58) Field of Classification Search
CPC .. C08L 69/00; C08L 2205/08; C08L 2205/03; C08L 2201/08; C08L 67/02; C08L 83/10; C08L 23/08; C08L 33/08
USPC ....................................................... 524/208
See application file for complete search history.

(56) References Cited

U.S. PATENT DOCUMENTS

| | | | |
|---|---|---|---|
| 2,999,835 A | 9/1961 | Goldberg | |
| 3,028,365 A | 4/1962 | Hermann et al. | |
| 3,036,036 A | 5/1962 | Howe | |
| 3,036,037 A | 5/1962 | Howe | |
| 3,036,038 A | 5/1962 | Howe | |
| 3,036,039 A | 5/1962 | Howe | |
| 3,169,121 A | 2/1965 | Goldberg | |
| 3,334,154 A | 8/1967 | Kim | |
| 3,544,514 A | 12/1970 | Schnell | |
| 4,105,633 A | 8/1978 | Swart et al. | |
| 4,156,069 A | 5/1979 | Prevorsek et al. | |
| 4,225,556 A | 9/1980 | Lothman | |
| 4,260,731 A | 4/1981 | Mori et al. | |
| 4,287,787 A | 9/1981 | Kulhanek | |
| 4,330,662 A | 5/1982 | Bales | |
| 4,355,150 A | 10/1982 | Bosnyak | |
| 4,360,656 A | 11/1982 | Swart et al. | |
| 4,374,973 A | 2/1983 | Prevorsek et al. | |
| 4,388,455 A | 6/1983 | Bales | |
| 4,474,999 A | 10/1984 | Mark et al. | |
| 4,652,602 A | 3/1987 | Liu | |
| 5,198,527 A | 3/1993 | Marks et al. | |
| 5,272,236 A | 12/1993 | Lai et al. | |
| 5,278,272 A | 1/1994 | Lai et al. | |
| 5,585,434 A | 12/1996 | DeNicola, Jr. et al. | |
| 5,597,887 A | 1/1997 | King et al. | |
| 5,904,673 A | 5/1999 | Roe et al. | |
| 5,994,467 A * | 11/1999 | Farah ...................... | C08L 69/00 525/166 |
| 6,525,157 B2 | 2/2003 | Cozwith | |
| 6,613,869 B1 | 9/2003 | Horn et al. | |
| 2003/0204017 A1 | 10/2003 | Stevens et al. | |
| 2010/0021717 A1 | 1/2010 | Manian | |
| 2010/0210778 A1* | 8/2010 | Lakeman ................ | C08L 23/10 524/443 |
| 2011/0098366 A1 | 4/2011 | Groteluschen et al. | |

FOREIGN PATENT DOCUMENTS

| | | |
|---|---|---|
| CN | 101809083 A | 8/2010 |
| EP | 0496258 B1 | 7/1992 |
| EP | 0528462 A1 | 2/1993 |
| JP | 2008/285663 A1 | 11/2008 |
| JP | 2008285663 A * | 11/2008 |

(Continued)

OTHER PUBLICATIONS

International Search Report and Written Opinion, Application No. PCT/EP2013/074456, dated Aug. 12, 2014.
International Preliminary Report on Patentability, Application No. PCT/EP2013/074456, dated Feb. 18, 2016.
Korean Office Action, Application No. KR 10-2016-7013086 dated Mar. 17, 2017.
Japanese Office Action, Application No. JP 2016-533138 dated Apr. 25, 2017.
First Chinese Office Action, Application No. CN 201380081035.6 dated Mar. 24, 2017.
Second Chinese Office Action, Application No. CN 201380081035.6 dated Oct. 18, 2017.
Office Action from the Russian Patent Office for Application No. 2016122213 dated Feb. 26, 2018.

*Primary Examiner* — Hui Chin
(74) *Attorney, Agent, or Firm* — The Dobrusin Law Firm, P.C.

(57) ABSTRACT

Polycarbonate-containing compositions having desirable properties, such as good resistance to environmental stress cracking, are achieved using a combination of a polycarbonate polymer, a compatibilizing agent and an olefinic elastomer. The polycarbonate-containing composition may include about 40-98 weight percent of one or more carbonates polymers; about 0.1-10 weight percent of one or more compatibilizing agents; and 0.1-10 weight percent of one or more olefinic elastomers. The polycarbonate-containing compositions (e.g., polycarbonate blend compositions) preferably have good chemical resistance to medium chain triglycerides. The compositions may be employed in components, such as housings, that require resistance to cleaning fluids used in hospitals. For example, the composition may be employed in components that require resistance to hospital grade tuberculosis disinfectants.

20 Claims, No Drawings

(56) References Cited

FOREIGN PATENT DOCUMENTS

| | | |
|---|---|---|
| JP | 2009/035616 A1 | 2/2009 |
| JP | 2011/140587 A1 | 7/2011 |
| JP | 2012/144604 A1 | 8/2012 |
| KR | 10-0227123 B1 | 10/1999 |
| RU | 2171821 C2 | 8/2001 |
| RU | 2458088 A | 12/2010 |
| WO | 03/040201 A1 | 5/2003 |
| WO | 2006/101932 A2 | 9/2006 |
| WO | 2006/101966 A1 | 9/2006 |
| WO | 2006/102155 A2 | 9/2006 |
| WO | 2008/057355 A2 | 5/2008 |
| WO | 2009/042323 A1 | 4/2009 |
| WO | 2013/017395 A1 | 2/2013 |

\* cited by examiner

POLYCARBONATE CONTAINING COMPOSITIONS

FIELD OF THE INVENTION

The invention relates to polycarbonate blend compositions and particularly to polycarbonate blend compositions having good chemical resistance to medium chain triglycerides (MCTs) and/or other fluids. The polycarbonate blend compositions preferably have improved chemical resistance to MCTs and/or other fluids compared with typical carbonate polymers, such as polycarbonates of bispenol-A.

BACKGROUND OF THE INVENTION

Uncompounded polycarbonates typically have poor environmental stress cracking resistance when exposed to various fluids. Accelerated testing can be performed by applying a strain to the polycarbonate prior to immersing in the fluid. Improvements in the environmental stress cracking resistance of polycarbonates have been achieved with a variety of compounding approaches. However, as described in US 2011/0098366A1 (incorporated herein by reference), polycarbonates generally have poor environmental stress cracking resistance to triglycerides and are thus not suitable for applications such as medical devices that may come into contact with triglycerides; or the packaging of pharmaceuticals, or other articles, including a triglyceride component.

As such there continues to be a need for polycarbonate compositions having improved resistance to environmental stress cracking when exposed to triglycerides (e.g., to medium chain triglycerides). There is also a need for polymeric materials having good resistance to disinfectant cleaners (e.g., quarternary ammonia containing disinfectant cleaners), such as cleaners employed for disinfecting surfaces from tuberculosis. There is also a need for polymeric materials having good resistance to fluids employed as oncology drug delivery fluids (such as placlitaxel), to N,N-dimethylacetamide (e.g. as employed as a solvent for Busulfex), to dimethyl sulfoxide, to etoposides such as Veepesid.

SUMMARY OF THE INVENTION

Improved environmental stress cracking resistance has been achieved using the polycarbonate compositions (i.e., polycarbonate blend compositions) according to the teachings herein. One aspect of the invention is directed at a composition comprising a blend of a plurality of polymers including: from about 40 weight percent to about 98 weight percent of one or more carbonates polymers; from about 0.1 weight percent to about 10 weight percent of one or more compatibilizing agent including one or more olefins; and from about 0.1 weight percent to about 10 weight percent of one or more olefinic elastomers; wherein the olefinic elastomer includes one or more α-olefins and the total concentration of the one or more α-olefins of the olefinic elastomer is from 95 weight percent to 100 weight percent based on the total weight of the olefinic elastomer. Preferred olefinic elastomers include two or more α-olefins. The compatibilizing agent preferably is selected from the group consisting of a copolymer including or consisting essentially of an acrylate monomer and one or more α-olefins, a copolymer including or consisting essentially of acrylic acid monomer and one or more α-olefins, an oxazoline functional olefin, a copolymer including or consisting essentially of one or more alkylacrylic acid monomers and one or more α-olefins, a copolymer or terpolymer including or consisting essentially of glycidiyl methacrylate and an α-olefin, a copolymer including maleic anhydride and one or more α-olefins, and a graft polymer having a backbone including, consisting essentially of, or consisting entirely of one or more α-olefins and a functional graft; wherein the functional graft is a maleic anhydride, an acrylate, an acrylic acid, an oxazoline, or a glycidyl methacrylate, or a combination thereof. The total concentration of the olefins in the compatibilizing agent is from about 10 weight percent to less than 95 weight percent based on the total weight of the compatibilizing agent.

Preferred compositions (i.e. polycarbonate blend compositions) are characterized by one or any combination of the following: the composition includes from about 10 weight percent to about 45 weight percent of one or more polyesters; the concentration of the carbonate polymer is about 70 weight percent or less; or the combined concentration of the polyester and the carbonate polymer is from about 75 weight percent to about 98 weight percent based on the total weight of the composition. Preferred compatibilizing agent include a copolymer including or consisting essentially of an acrylate monomer and one or more α-olefins, a copolymer including or consisting essentially of acrylic acid monomer and one or more α-olefins, an oxazoline functional olefin, a copolymer including or consisting essentially of one or more alkylacrylic acid monomers and one or more α-olefins, a copolymer or terpolymer including or consisting essentially of glycidiyl methacrylate and an α-olefin, a copolymer including maleic anhydride and one or more α-olefins, a graft polymer (e.g., an olefin-containing graft polymer), or any combination thereof. Preferred graft copolymers have a backbone including, consisting essentially of, or consisting entirely of one or more α-olefins and further include a functional graft. The functional graft preferably is a maleic anhydride, an acryalate, an acrylic acid, an oxazoline, or a glycidyl methacrylate. Particularly preferred compatibilizing agents are copolymers including one or more α-olefins and one or more alkyl acrylates.

DETAILED DESCRIPTION

Improved environmental stress cracking resistance is achieved using one or more engineering resins. When employing a high concentration of the engineering resin(s) (e.g., about 75 weight percent or more engineering resin), compositions having good mechanical properties are also achieved. The compositions are based on carbonate polymer as the primary engineering resin. The improvement in the environmental stress cracking resistance is predicated on the use of one or more additional components such as a polyester (e.g., a polyester engineering resin), a silcon-containing rubber (such as a rubber including silicone groups), a compatibilizing agent, or an olefinic elastomer.

Carbonate Polymer

They may include combinations of two or more polymers (e.g., two or more polycarbonates each having a different melt flow rate). The carbonate polymer may include one or more branched polymers, one or more linear polymers, or both.

Examples of carbonate polymers employed in the present invention include aromatic carbonate polymers such as the trityl diol carbonates described in U.S. Pat. Nos. 3,036,036; 3,036,037; 3,036,038 and 3,036,039; polycarbonates of bis (arhydroxyphenyl)-alkylidenes (also called bisphenol-A type diols) including their aromatically and aliphatically substituted derivatives such as disclosed in U.S. Pat. Nos.

2,999,835; 3,028,365 and 3,334,154; and carbonate polymers derived from other aromatic diols such as described in U.S. Pat. No. 3,169,121. The carbonate polymer may be derived from (1) two or more different dihydric phenols or (2) a dihydric phenol and a glycol or an hydroxy- or acid-terminated polyester or a dibasic acid in the event a carbonate copolymer or interpolymer rather than a homopolymer is desired. The one or more carbonate polymers may include a blend including, or consisting of one or more of the above carbonate polymers. Additional examples of carbonate polymer that may be employed in the present invention include ester/carbonate copolymers, such as those described in U.S. Pat. Nos. 3,169,121; 4,105,633; 4,156,069; 4,225,556; 4,260,731; 4,287,787; 4,330,662; 4,355,150; 4,360,656; 4,374,973; and 4,388,455. Preferred carbonate polymers include polycarbonates of bisphenol-A and derivatives, including copolycarbonates of bisphenol-A. By way of further illustration, examples of carbonate polymers are described in EP 0496258B1, incorporated herein by reference. The carbonate polymer may include a carbonate polymer as described in U.S. Pat. No. 5,904,673, incorporated herein by reference. For example, such particularly preferred carbonate polymer includes a blend of a branched polycarbonate and a linear polycarbonate. Methods for preparing carbonate polymers are well known, for example, several suitable methods are disclosed in the aforementioned patents which are hereby incorporated by reference in their entirety.

Preferred branched chain carbonate polymers used in this invention may be prepared by any suitable process. For example, they may be made by reacting a dihydric phenol with phosgene in the presence of a trihydric and/or tetrahydric phenol. U.S. Pat. No. 3,544,514 discloses the process details and this patent is incorporated herein by reference. Blow moldable resins and their desired properties are taught in U.S. Pat. Nos. 4,652,602 and 4,474,999 which are incorporated herein by reference. See also U.S. Pat. Nos. 6,613,869; 5,597,887; and 5,198,527, both incorporated by reference. U.S. Pat. No. 6,613,869, for example, describes a possible approach to the preparation of a branched polycarbonate, pursuant to which a melt transesterification process is employed, along with a trifunctional branching agent (e.g., 1,1,1-tris(4-hydroxyphenyl)ethane; 3,3-bis(3-methyl-4-hydroxyphenyl)-2-oxo-2,3-dihydroindole; or both)).

The carbonate polymer preferably is present in an amount of about 40 weight percent or more, more preferably about 45 weight percent or more, and most preferably about 50 weight percent or more, based on the total weight of the plurality of polymers of the composition. The carbonate polymer preferably is present in an amount of about 98 weight percent or less, more preferably about 96 weight percent or less, even more preferably about 95 weight percent or less, and most preferably about 90 weight percent or less, based on the total weight of the composition.

Preferred carbonate polymers have a melt flow rate of about 0.5 g/10 min or more, more preferably about 1.0 g/10 min or more, even more preferably about 2 g/10 min or more, and most preferably about 5 g/10 min or more, as measured according to ISO 1133 at 300° C./1.2 kg. Preferred carbonate polymers have a melt flow rate of about 150 g/10 min or less, more preferably about 80 g/10 min or less, even more preferably about 55 g/10 min or less, and most preferably about 35 g/10 min or less.

The carbonate polymer preferably has a molecular weight sufficiently high so that the polymer is not brittle. The carbonate polymer preferably has a molecular weight sufficiently low so that the polymer can be easily processed (e.g., can be extruded and/or injection molded). The carbonate polymer preferably exhibits a weight average molecular weight ($M_w$) of at about 3,000 or more, more preferably about 6,000 or more, even more preferably about 10,000 or more and most preferably about 15,000 or more. The carbonate polymer preferably exhibits a weight average molecular weight ($M_w$) of about 150,000 or less, more preferably about 80,000 or less, even more preferably about 50,000 or less, and most preferably about 43,000 or less. "Weight average molecular weight" as employed herein is determined according to a liquid chromatography method by which 0.02 gram samples are prepared by mixing the sample for at least 8 hours with 10 mL of chloroform. The mixture is then filtered through a 0.2µ syringe filter and is analyzed by size exclusion chromatography (SEC). Results are analyzed against a reference material with a known molecular weight. Samples are characterized using two mixed bed columns (e.g., available from Varian, Inc.), coupled with a ultraviolet light detector (e.g., a chromatography absorbance detector, such as Model 757 available from Applied Biosystems). Column temperature is kept at about 35° C. Flow rate of the sample is about 1 ml/min. A tetrahydrofuran eluent is employed for providing sample sizes at about 15 µl each. The unit of measure for the molecular weight is typically daltons.

Preferred properties and characteristics of a carbonate polymer for use herein will typically include at least one or any combination of a flexural modulus (tangent) per ASTM D790-07, of about 1800 MPa or more (more preferably about 2200 MPa or more); a flexural modulus of about 3000 MPa or less (more preferably about 2700 MPa or less); a temperature of deflection under load (DTUL)(1.81 MPa) per ASTM D648-07 of about 105° C. or more (more preferably about 125° C. or more, and most preferably about 130° C. or more); a tensile elongation at break per ASTM D638-03 (ISO 527-1) of about 80% or more (more preferably about 90% or more and most preferably about 100% or more); a tensile elongation at break of about 300% or less (e.g., about 200% or less); a notched Izod impact strength per ISO 180/A (at 23° C.) of about 20 kJ/m$^2$ or more (more preferably about 45 kJ/m$^2$ or more and most preferably about 75 kJ/m$^2$ or more); or a notched Izod impact strength of about 180 kJ/m$^2$ or less (e.g., about 130 kJ/m$^2$ or less).

Examples of commercially available carbonate polymers include those available from Styron LLC, or its affiliates, under the designation CALIBRE®, such as the 200 series or the 300 series (e.g., grades 300-10, 301-10, or 201-10).

The weight ratio of the carbonate polymer (e.g., the carbonate of bisphenol-A) to the compatibilizing agent (e.g., the copolymer of ethylene and ethyl acrylate) is preferably about 10 or more, more preferably about 15 or more, even more preferably about 20 or more, and most preferably about 30 or more. The weight ratio of the carbonate polymer (e.g., the carbonate of bisphenol-A) to the compatibilizing agent (e.g., the copolymer of ethylene and ethyl acrylate) is preferably about 350 or less, more preferably about 250 or less, even more preferably about 150 or less, and most preferably about 120 or less. When the composition employs one or more polyesters, the ratio of the total weight of the carbonate polymer and the polyester to the weight of the compatibilizing agent preferably is about 10 or more, more preferably about 15 or more and most preferably about 30 or more. Such compositions preferably have a ratio of the total weight of the carbonate polymer and the polyester to the weight of the compatibilizing agent that is about 350 or less, more preferably about 250 or less and most preferably about 120 or less.

The weight ratio of the carbonate polymer (e.g., the carbonate of bisphenol-A) to the olefinic elastomer (e.g., the propylene-ethylene copolymer) is preferably about 4 or more, more preferably about 7 or more, even more preferably about 10 or more, and most preferably about 15 or more. The weight ratio of the carbonate polymer (e.g., the carbonate of bisphenol-A) to the compatibilizing agent (e.g., the copolymer of ethylene and ethyl acrylate) is preferably about 250 or less, more preferably about 150 or less, even more preferably about 100 or less, and most preferably about 70 or less. When the composition employs one or more polyesters, the ratio of the total weight of the carbonate polymer and the polyester to the weight of the compatibilizing agent preferably is about 5 or more, more preferably about 8 or more and most preferably about 16 or more. Such compositions preferably have a ratio of the total weight of the carbonate polymer and the polyester to the weight of the compatibilizing agent that is about 250 or less, more preferably about 150 or less and most preferably about 90 or less.

The weight ratio of the polyester to the carbonate polymer may be about 0 or more, about 0.1 or more, about 0.2 or more, about 0.3 or more, or about 0.5 or more. Preferably, the weight ratio of the polyester to the carbonate polymer is about 3 or less, more preferably about 2 or less, even more preferably about 1.5 or less, and most preferably about 1.0 or less.

Compatibilizing Agent

The composition includes one or more compatibilizing agents suitable for improving the compatibility between the two different polymers in the composition. For example, the compatibilizing agent may function by improving the compatibility between the carbonate polymer and the silicon containing rubber, improving the compatibility between the carbonate polymer and the olefinic elastomer, or both. Preferred compatibilizing agents improve the compatibility between the carbonate polymer and the olefinic elastomer. The compatibilizing agent preferably includes a sufficient amount of functional monomer or other functional groups (e.g., grafted functional groups) so that the compatibilizing agent has relatively good compatibility with the carbonate polymer (e.g. relative to the olefinic elastomer). Preferred functional monomers and preferred functional groups include one or more oxygen atoms, one or more nitrogen atoms, or both.

The compatibilizing agent may include a copolymer including or consisting essentially of an acrylate monomer and one or more α-olefins, a copolymer including or consisting essentially of acrylic acid monomer and one or more α-olefins, an oxazoline functional olefin, a copolymer including or consisting essentially of one or more alkylacrylic acid monomers and one or more α-olefins, a copolymer or terpolymer including or consisting essentially of glycidiyl methacrylate and an α-olefin, a copolymer including maleic anhydride and one or more α-olefins, and a graft polymer having a backbone including, consisting essentially of, or consisting entirely of one or more α-olefins and a functional graft; wherein the functional graft is a maleic anhydride, an acryalate, an acrylic acid, an oxazoline, or a glycidyl methacrylate.

The compatibilizing agent may include copolymers including one or more olefins and one or more functional monomers. Examples of functional monomers useful for a compatibilizing agent include acrylates (e.g., alkyl acrylates), acrylic acid, methacrylic acid, glycidyl acrylates (e.g. glycidyl methacrylate), maleic anhydride, or any combination thereof. Preferred acrylates include ethyl acrylate, methyl acrylate, ethyl acrylate, and butyl acrylate. The one or more olefins preferably includes, consists essentially of, or consists entirely of one or more α-olefins. Preferred α-olefins include 2 to 20 carbon atoms, more preferably 2-8 carbon atoms, and most preferably 2-6 carbon atoms. For example, the one or more α-olefins may include ethylene, propylene, 1-butene, 1-hexene, 1-octene, or any combination thereof. Ethylene and propylene are particularly preferred α-olefins. The concentration of the one or more olefins (e.g., the one or more α-olefins) of the compatibilizing agent may be about 10 weight percent or more, about 20 weight percent or more, about 25 weight percent or more, about 40 weight percent or more, about 50 weight percent or more, about 60 weight percent or more, about 70 weight percent or more, about 75 weight percent or more, or about 78 weight percent or more, based on the total weight of the compatibilizing agent. The concentration of the one or more olefins (e.g., the one or more α-olefins) of the compatibilizing agent may be about 95 weight percent or less, about 93 weight percent or less, about 90 weight percent or less, or about 85 weight percent or less, based on the total weight of the compatibilizing agent. A particularly preferred compatibilizing agent includes one or more alkyl acrylates at a concentration from about 10 to 90 weight percent and 10 to 90 weight percent of one or more α-olefins. The total amount of the alkyl acrylates and the α-olefins may be about 50 weight percent or more, about 80 weight percent or more, about 95 weight percent or more, about 98 percent or more, or even about 100 percent, based on the total weight of the compatibilizing agent. For example, the compatibilizing agent may include, consist essentially of, or consist entirely of 70 weight percent or more α-olefin (e.g., ethylene) and an alkyl acrylate (e.g. ethyl acrylate).

When the compatibilizing agent is not present, composition with even low concentrations of olefinic elastomer may show orange peel appearance upon extrusion. The compatibilizing agent preferably is present at a sufficient concentration so that the amount of olefinic elastomer in the composition may be about 0.5 weight percent or more, about 1.0 weight percent or more, about 1.5 weight percent or more, about 2.0 weight percent or more, or about 2.5 weight percent or more, without orange peel appearance upon extrusion. The concentration of the compatibilizing agent preferably is sufficiently low so that phase separation of the compatibilizing agent into large domains (e.g., 5 μm or larger) is prevented. The compatibilizing agent may be present at a concentration of about 0.1 weight percent or more, preferably about 0.25 weight percent or more, more preferably about 0.50 weight percent or more, even more preferably about 0.75 weight percent or more, and most preferably about 1 weight percent or more, based on the total weight of the polymers of the polycarbonate blend composition and/or based on the total weight of the polycarbonate blend composition. The compatibilizing agent may be present at a concentration of about 20 weight percent or less, preferably about 15 weight percent or less, more preferably about 10 weight percent or less, even more preferably about 8 weight percent or less, and most preferably about 5 weight percent or less, based on the total weight of the polymers of the polycarbonate blend composition and/or based on the total weight of the polycarbonate blend composition. For example, the compatibilizing agent may be present at a concentration of 0.1 to 10 weight percent, 1.0 to 5.0 weight percent, or 2 to 4 weight percent.

The compatibilizing agent preferably has a melting temperature of about 50° C. or more, more preferably about 60° C. or more, and most preferably about 70° C. or more. The compatibilizing agent preferably has a melting temperature less than the melting temperature of the carbonate polymer. Preferably, the melting temperature of the compatibilizing agent is about 200° C. or less, more preferably about 150° C. or less, even more preferably about 130° C. or less, and most preferably about 110° C. or less. The melting temperature of the compatibilizing agent may be measured using differential scanning calorimetry.

The compatibilizing agent may have a melt flow rate of about 0.1 or more, about 0.5 or more, about 2 or more, or about 5 or more. The compatibilizing agent may have a melt flow rate of about 1000 or less, about 100 or less, about 40 or less, or about 30 or less. The melt flow rate may be measured according to ASTM D1238. It will be appreciated that the conditions for measuring the melt flow rate will depend on the composition of the compatibilizing agent. For example, for a compatibilizing agent including 50 wt. % or more ethylene, the melt flow rate will be measured at 190° C./2.16 kg. For a compatibilizing including 50 wt. % or more propylene, the melt flow rate will be measured at 230° C./2.16 kg.

Preferably, the composition is substantially free of, or entirely free of compatibilizing agent that is a graft copolymer. If employed, the amount of any compatibilizing graft copolymer preferably is about 3 weight percent or less, more preferably about 2 weight percent or less, even more preferably about 1 weight percent or less, based on the total weight of the compatibilizing graft copolymer and the carbonate polymer.

Olefinic Elastomer

The olefinic elastomer surprisingly results in improved chemical resistance (e.g., resistance to MCT's) when used in compositions including one or more polycarbonate polymers. The olefinic elastomer preferably is a flexible material at room temperature. Such materials typically have low crystallinity at ambient conditions. The olefinic elastomer preferably has sufficiently low crystallinity so that internal stresses are reduced or minimized when the composition is cooled from a molten state, such as during a step of forming a part from the composition. The olefinic elastomer may be entirely amorphous or may have some crystallinity at ambient conditions. Preferably, the olefinic elastomer has sufficient crystallinity so that the neat olefinic elastomer can be formed into free flowing pellets. A desired crystallinity of the olefinic elastomer may be achieved by any art known means. For example, the olefinic elastomer may be a homopolymer, or a copolymer (e.g., a random copolymer) including, consisting essentially of, or consisting entirely of two or more α-olefins. Preferred copolymers include a primary monomer and one or more secondary monomers, where the concentration of the primary monomer is selected to achieve the desired crystallinity. Such copolymers (e.g., random copolymer) may be polymerized by any art known process. It will be appreciated that the amount of the primary monomer may depend on the polymerization process (e.g., due to some polymerization processes to result in a more random distribution of the monomers than other processes). Preferred process for preparing a random copolymer include process that employ a catalyst characterized as a single site catalyst and/or characterized as a metallocene catalyst.

The olefinic elastomer preferably is selected so that it has a crystallinity similar to the crystallinity of the compatibilizing agent. The absolute value of the difference between the crystallinity of the olefinic elastomer and the compatibilizing agent, $\Delta X_c$, preferably is about 25% or less, more preferably about 15% or less, even more preferably about 10% or less, even more preferably about 5% or less, and most preferably about 3% or less. For example, a compatibilizing agent having a crystallinity of 15% and a olefinic elastomer having a crystallinity of 20% would have $\Delta X_c = 5\%$. The compatibilizing agent and the olefinic elastomer may have the same or different crystallinity. The crystal structure of the compatibilizing agent may be the same or different from the crystal structure of the olefinic elastomer. By way of example, the olefinic elastomer may have a crystal structure from the propylene repeating units and the compatibilizing agent may have a crystal structure from ethylene repeating units. As another example, both the olefinic elastomer and the compatibilizing agent may have crystal structures characteristic of ethylene repeating units.

Suitable olefinic elastomers include olefinic block copolymers including hard blocks having relatively high crystallinity and soft blocks that have a crystallinity less than the crystallinity of the hard blocks.

Olefinic block copolymers may be prepared using a process that sequentially polymerizes two or more blocks (e.g., a hard block and then a soft block). The hard block typically includes a high concentration of a primary monomer arranged in a structure such that the hard blocks has sufficient crystallinity so that the neat olefinic block copolymer can be stored as pellets without the pellets agglomerating (e.g., under typical storage conditions for polyolefin thermoplastics). The hard blocks and the soft blocks may include essentially the same composition of monomers, or may include different monomer compositions. For example, an olefinic block copolymer may include blocks having (or consisting essentially of, or consisting entirely of) a primary monomer of an α-olefin (e.g., propylene) where the hard blocks include the α-olefin monomer arranged in a relatively high isotactic configuration and the soft block include the α-olefin arranged in a less isotactic configuration (e.g., in an atactic configuration). As another example, an olefinic block copolymer may include a hard block having a relatively high concentration of a primary monomer (e.g., consisting essentially of, or consisting entirely of the primary monomer) and the soft block may have a relatively low concentration of the primary monomer (e.g., a sufficiently low concentration of the primary monomer so that the crystallinity of the soft block is reduced or eliminated). An olefinic block copolymer may be prepared by any method known in the art. For example, the olefinic block copolymer may be prepared using a process that employs a plurality of catalysts having different catalyst sites or a catalyst having different catalyst sites, where one catalyst site is employed for polymerizing a hard block and the second site is employed for polymerizing a soft block. Such a process preferably employs an agent suitable for stopping a step of polymerization at one catalyst site so that the polymer may continue polymerizing in a second step of polymerization at a different catalyst site. Preferred olefinic block copolymers include an average of two or more hard blocks (e.g., three or more hard blocks) and an average of one or more (e.g., two or more, or three or more) soft blocks per polymer molecule.

Preferred olefinic elastomers include an olefinic block copolymer (e.g., a lower-α-olefin/α-olefin interpolymer such as an ethylene/α-olefin interpolymer or an ethylene/α-olefin interpolymer), a substantially linear or linear ethylene polymer ("S/LEP"), a propylene elastomer, or any combination thereof.

The olefinic elastomer preferably has one or more solid to liquid phase transitions at a temperature above about 40° C. For example, the olefinic elastomer may be a semi-crystalline polymer having a melting temperature. Preferred olefinic elastomers have a melting temperature of about 50°

C. or more, or about 60° C. or more. The olefinic elastomer may have a melting temperature of about 170° C. or less, about 140° C. or less, about 100° C. or less, or about 85° C. or less. Melting temperature of the olefinic elastomer may is measured by differential scanning calorimetry at a heating rate of about 10° C./min on a sample which has been cooled from about 220° C. to about 0° C. at a rate of about 10° C./min and is taken as the peak melting temperature.

The olefinic elastomer is characterized by a low glass transition temperature (e.g., about 10° C. or less, about −10° C. or less, or about −30° C. or less). Typically the glass transition temperature is about −100° C. or more (e.g., about −60° C. or more). The olefinic elastomer is relatively flexible at room temperature (e.g., compared with the carbonate polymer and/or the polyester, such as measured by flexural modulus according to ISO 178 at 2 mm/min). The olefinic elastomer may have a crystallinity greater than about 2%, preferably greater than about 3%, more preferably greater than about 5%, and most preferably greater than about 7% (e.g., greater than about 10%) by weight. The second olefinic elastomer may have a crystallinity less than about 44%, preferably less than about 40%, more preferably less than about 35% and most preferably less than about 30% (e.g., less than about 20%) by weight. For example, the olefinic elastomer may have a crystallinity from about 2% to about 44%, preferably from about 2% to about 40%, more preferably from about 5% to about 35% and most preferably from about 7% to about 30% (e.g., from about 10% to about 20%) by weight. Crystallinity of the olefinic elastomer may is measured by differential scanning calorimetry at a heating rate of about 10° C./min on a sample which has been cooled from about 220° C. to about 0° C. at a rate of about 10° C./min.

The olefinic elastomer may be present in the amount of about 0.1 wt. % or more, preferably about 1 wt. % or more, and more preferably about 1.5 wt. % or more, and most preferably about 2.0 wt. % or more, based on the total weight of the composition. The olefinic elastomer may be present in the amount of about 10 wt. % or less, preferably about 7.5 wt. % or less, more preferably about 6.0 wt. % or less, and most preferably about 5.0 wt. % or less, based on the total weight of the composition.

Preferred olefinic elastomers include, consist essentially of, or consist entirely of one or more α-olefins. The concentration of the one or more α-olefins in the olefinic elastomer may be about 80 weight percent or more, preferably about 95 wt. % or more, more preferably about 97 wt. % or more and most preferably about 99 wt. % or more, based on the total weight of the olefinic elastomer. The total weight of the one or more α-olefins in the olefinic elastomer may be about 100 wt. % or less, or about 99.5 wt. % or less, based on the total weight of the olfenic elastomer. Particularly preferred olefinic elastomers consist entirely of the one or more α-olefins. By way of example, the olefin elastomer may include two α-olefins (e.g., ethylene and propylene, ethylene and butene, ethylene and hexene, ethylene and octene, propylene and butene, propylene and hexene, or propylene and octene) wherein the total concentration of the two α-olefins is 80 weight percent or more, 95 weight percent or more, 97 weight percent or more, or 99 weight percent or more, based on the total weight of the olefinic elastomer. The one or more α-olefins preferably includes a primary α-olefin having a concentration of about 50 mole percent or more, based on the total number of monomer units in the olefinic elastomer, and preferably about a concentration of 50 weight percent or more, based on the total weight of the olefinic elastomer. The primary α-olefin preferably is selected from the group consisting of ethylene, propylene, butene, hexene and octene. More preferably the primary α-olefin is ethylene or propylene. Preferred olefinic elastomers having a primary α-olefin of ethylene typically have crystals characteristic of polyethylene. Preferred olefinic elastomers having a primary α-olefin of propylene typically have crystals characteristic of polypropylene.

The olefinic elastomer may employ one or more α-olefin soft thermoplastics (e.g. α-olefin elastomers), such as one or more linear ethylene copolymers (also known as "LEPs"), one or more substantially linear ethylene copolymers (also known as "SLEPs"), or both. As used herein, "S/LEPs" typically include LEPs and/or SEPs. Substantially linear ethylene copolymers and linear ethylene copolymers and their method of preparation are fully described in U.S. Pat. Nos. 5,272,236; and 5,278,272, which are fully incorporated herein by reference for all purposes. Preferred S/LEPs include, consist essentially of, or consist entirely of two or more α-olefins. Such polymers include a primary α-olefin having a concentration of about 50 weight percent or more, based on the total weight of the S/LEP. Preferred S/LEPs have a primary α-olefins of ethylene and one or more secondary α-olefins. Preferred secondary α-olefins are commoners selected from the group consisting of butene, hexene, and octene. For example, the S/LEP may include, consist essentially of, or consist entirely of ethylene, butene, hexene, and octene. Particularly preferred S/LEPs include ethylene and octene, and more preferably consist essentially or consist entirely of ethylene and octene. Preferred S/LEPs include the primary α-olefin at a concentration of about 80 wt. % or less, more preferably about 75 wt. % or less, and most preferably about 70 wt. % or less. The concentration of the primary α-olefin may be selected so that the olefinic elastomer has a desired crystallinity, such as a crystallinity according to the teachings herein. By way of example, the S/LEP may have a crystallinity from about 2% to about 14%, from about 3% to about 11%, or from about 4% to about 9%.

S/LEPs for use in the olefinic elastomer generally have a density of between about 0.8 to about 0.9 g/cm$^3$ (e.g., from about 0.855 to about 0.895 g/cm$^3$) as measured according to ASTM D 792-00. Suitable S/LEPs may have a density of at least 0.850, preferably at least 0.855, more preferably at least 0.860, most preferably at least 0.867 g/cm$^3$. The density of the S/LEP may be less than about 0.908, preferably less than about 0.900, more preferably less than about 0.890, and most preferably less than about 0.880 g/cm$^3$. Densities are determined as measured by ASTM D 792-00. Suitable S/LEPs may be characterized by a melt index as measured according to ASTM D-1238-04 (at 190° C., 2.16 kg) of at least about 0.2, preferably at least about 0.5, more preferably at least about 1.0, and still more preferably at least about 5 g/10 min. The melt index also may be about 600 g/10 min or less, preferably about 150 g/10 min or less, more preferably about 80 g/10 min or less, and most preferably about 60 g/10 min or less.

The olefinic elastomer may include or consist essentially of a polypropylene elastomer. Suitable polypropylene elastomers may contain propylene monomer at a concentration greater than about 50 wt. %, preferably greater than about 65 wt. %, more preferably greater than about 70 wt. %, and most preferably greater than about 80 wt. % (e.g., at least 85 wt. %) based on the weight of the polypropylene elastomer. The polypropylene elastomer may also contain one or more additional $C_{2-12}$ α-olefin comonomers (e.g., a comonomer including ethylene, or consisting of ethylene, or including butene, or consisting of butene) at a concentration greater than about 5 wt. %, preferably greater than about 7 wt. %, more preferably greater than about 9 wt. %, and most preferably greater than about 12 wt. % based on the total weight of the polypropylene elastomer. For example, the comonomer content may range from about 5 to about 40 percent by weight of the polypropylene elastomer composition, more preferably from about 7 to about 30 percent by weight of the polypropylene elastomer composition, and still more preferably from about 9 to about 15 percent by weight of the polypropylene elastomer composition. The polypropylene elastomer preferably is semi-crystalline, having a crystallinity according to the teachings herein. Suitable polypropylene elastomers may have a melting temperature of about 130° C. or less, preferably about 115° C. or less, and most preferably about 100° C. or less, as measured by differential scanning calorimetry at a heating rate of about 10° C./min on a sample which has been cooled from about 220° C. to about 0° C. at a rate of about 10° C./min.

The propylene elastomer preferably is a comonomer including or consisting of a primary monomer of propylene and one or more comonomers selected from the group consisting of ethylene, butene, hexene, and octene. For example, the propylene elastomer may be a copolymer of propylene and ethylene, butene, or octene. Most preferably the propylene elastomer includes or consists essentially of propylene with ethylene, butene, or both.

The polypropylene elastomer may exhibit a Shore A hardness (i.e., durometer) as measured according to ASTM D 2240-05 of at least about 40, more preferably at least about 50, still more preferably at least about 65. The Shore A hardness may also be less than about 97, preferably less than about 95, more preferably less than about 92, still more preferably less than about 85 (e.g., less than about 80). For example, the polypropylene elastomer may have a Shore A hardness from about 40 to about 97, more preferably from about 50 to about 95, and still more preferably from about 65 to about 95 Shore A. Suitable polypropylene elastomer may have a melt flow rate as measured according to ASTM D1238 at 230° C./2.16 kg of at least 0.5, preferably at least about 1, more preferably at least about 3, and most preferably at least about 5 g/10 min. Without limitation, the propylene elastomers suitable for the polymeric composition may have a melt flow rate of less than about 1500, preferably less than about 150, more preferably less than about 100, and most preferably less than about 60 g/10 min. It is preferred that the polypropylene elastomer exhibit at least some crystallinity. For example, the crystallinity may be at least about 2, preferably at least about 5, and still more preferably at least about 7 percent by weight of the polypropylene elastomer material. Without limitation, suitable polypropylene elastomers may have a crystallinity less than about 50 wt. %. For example, the crystallinity of the propylene elastomer may be less about 40, preferably less than about 35, more preferably less than about 28, and still more preferably less than about 20 percent by weight of the polypropylene elastomer material, In general, suitable propylene elastomer may have a crystallinity from about 2 wt. % to about 50 wt. %. For example, the crystallinity may range from about 2 to about 40, more preferably from about 5 to about 35, and still more preferably about 7 to about 20 percent by weight of the polypropylene elastomer material.

If the propylene elastomer is a copolymer of propylene and ethylene (i.e, the comonomer is ethylene) then it will be appreciated from the above that the resulting preferred overall compositions (i.e., the polymeric composition) which include a propylene elastomer will therefore have an ethylene content (i.e. a total ethylene content). For example, in one aspect the overall ethylene content in the final resulting composition may be greater than about 2 percent by weight of the overall resulting composition, preferably greater than about 3 percent by weight of the overall resulting composition, and more preferably greater than about 4 percent by weight of the overall resulting composition. In this aspect of the invention, It is generally expected however that the total concentration of ethylene in the overall resulting composition will be less than about 35 percent by weight of the overall composition, preferably less than about 25 percent by weight of the overall composition, more preferably less than about 20 percent by weight of the overall composition, and still more preferably less than about 10 percent by weight of the overall resulting composition. If the propylene elastomer is a copolymer of propylene and a $C_4$-$C_{12}$ α-olefin (e.g., butene, hexane, or octene), then it will be appreciated from the above that the resulting preferred overall compositions (i.e., the polymeric composition) which include a propylene elastomer will therefore have a total $C_4$-$C_{12}$ α-olefin. For example, in one aspect the overall $C_4$-$C_{12}$ α-olefin content in the final resulting composition may be greater than about 2 percent by weight of the overall resulting composition, preferably greater than about 3 percent by weight of the overall resulting composition, and more preferably greater than about 4 percent by weight of the overall resulting composition. In this aspect of the invention, It is generally expected however that the total concentration of $C_4$-$C_{12}$ α-olefin in the overall resulting composition will be less than about 35 percent by weight of the overall composition, preferably less than about 25 percent by weight of the overall composition, more preferably less than about 20 percent by weight of the overall composition, and still more preferably less than about 10 percent by weight of the overall resulting composition.

Without limitation, suitable propylene elastomers that may be employed in accordance with the present teachings include those disclosed in International Patent Application Publication No. WO 03/040201 A1 filed on May 6, 2002, published US Patent Application No. 2003/0204017 filed on May 5, 2002, and U.S. Pat. No. 6,525,157 issued on Feb. 25, 2003, all of which are incorporated by reference. For example, the propylene elastomer may be a low elasticity α-olefin-propylene copolymer, such as a low elasticity ethylene-propylene copolymer (i.e., an LEEP copolymers) taught in U.S. Pat. No. 6,525,157 issued on Feb. 25, 2003, incorporated herein by reference. Such an LEEP, as described in U.S. Pat. No. 6,525,157 issued on Feb. 25, 2003 from column 2, line 15 to column 3, line 54 may be (LEEP) copolymers that when produced in the presence of a metallocene catalyst and an activator, in a single steady state reactor, show a surprising and unexpected balance of flexural modulus, tensile strength and elasticity. Moreover, these and other properties of the (LEEP) copolymers show surprising differences relative to conventional polymer blends, such as blends of isotactic polypropylene and ethylene-propylene copolymers. In one embodiment, the (LEEP) copolymer includes from a lower limit of 5% or 6% or 8% or 10% by weight to an upper limit of 20% or 25% by weight ethylene-derived units, and from a lower limit of 75% or 80% by weight to an upper limit of 95% or 94% or 92% or 90% by weight propylene-derived units, the percentages by weight based on the total weight of propylene- and ethylene-derived units. The copolymer is substantially free of diene-derived units.

Another example of a propylene elastomer which may be used is a region-error containing propylene-ethylene copolymer (i.e., a R-EPE copolymer) as described in U.S. Patent Application Publication No. 2003/0204017 (published Oct. 30, 2003).

As disclosed in U.S. Patent Application Publication No. 2003/0204017 (published Oct. 30, 2003) paragraph [0006], the R-EPE copolymers may be characterized as comprising at least about 60 weight percent (wt %) of units derived from propylene, about 0.1-35 wt % of units derived from ethylene, and 0 to about 35 wt % of units derived from one or more unsaturated comonomers, with the proviso that the combined weight percent of units derived from ethylene and the unsaturated comonomer does not exceed about 40. These copolymers are also characterized as having at least one of the following properties: (i) $^{13}$C NMR peaks corresponding to a regio-error at about 14.6 and about 15.7 ppm, the peaks of about equal intensity, (ii) a B-value greater than about 1.4 when the comonomer content, i.e., the units derived from ethylene and/or the unsaturated comonomer(s), of the copolymer is at least about 3 wt %, (iii) a skewness index, $S_{ix}$, greater than about −1.20, (iv) a DSC curve with a $T_{me}$ that remains essentially the same and a $T_{max}$ that decreases as the amount of comonomer, i.e., the units derived from ethylene and/or the unsaturated comonomer(s), in the copolymer is increased, and (v) an X-ray diffraction pattern that reports more gamma-form crystals than a comparable copolymer prepared with a Ziegler-Natta (Z-N) catalyst. Typically the copolymers of this embodiment are characterized by at least two, preferably at least three, more preferably at least four, and even more preferably all five, of these properties.

The olefinic elastomer may include an olefinic block copolymer. Such a block copolymer may be characterized as a multi-block polymer having a plurality of blocks, including a hard block having a relatively high crystallinity and a soft block having a crystallinity lower than the hard block. The multi-block polymer (e.g., the multi-block olefinic polymer) may be a homopolymer including essentially one (e.g., one) α-olefin monomer or copolymer including two α-olefin monomers a terpolymer including three or more monomers (which typically contain at least two monomers that are α-olefins and may even contain three α-olefins) or may contain four or more of α-olefin monomers. A multi-block homopolymer may contain hard and soft blocks having the same monomer, the differences in the blocks being the regularity of the monomers (e.g., the hard block may have monomers which are more regularly oriented than the soft block, so that the hard block has a higher crystallinity). An olefinic block copolymer may contain blocks having different concentrations of monomers. For example, an olefinic block copolymer may have one or more hard blocks which contains a high concentration (e.g., greater than about 80 wt. %, preferably greater than about 90 wt. %, more preferably greater than about 95 wt. %, and most preferably greater than about 99 wt. %, or even 100 wt. % of the olefinic block copolymer) of a first α-olefinic monomer and a low concentration of a second α-olefin monomer and one or more soft blocks which contain a concentration of the first α-olefin which is lower than the in the one or more hard blocks. Preferably the first α-olefin is a lower α-olefin (LOA) which is ethylene or propylene, such that the olefinic block copolymer is a LOA/α-olefin interpolymer. Without limitation, the olefinic block copolymer may be an ethylene/α-olefin interpolymer or a propylene/α-olefin interpolymer. Examples of LOA/α-olefin interpolymer which may be used in the second polymeric component are described in PCT International Patent Publication Nos. WO2006/102155A2 (filed Mar. 15, 2006), WO2006/101966A1 (filed Mar. 15, 2006), and WO2006101932A2 (filed Mar. 15, 2006), all of which are expressly incorporated herein by reference in there entirety.

The olefinic elastomer may include an ethylene/α-olefin interpolymers. Such interpolymers may include ethylene and one or more copolymerizable α-olefin comonomers in polymerized form, characterized by multiple blocks or segments of two or more polymerized monomer units differing in chemical or physical properties (block interpolymer), preferably a multi-block copolymer. Without limitation, exemplary ethylene/α-olefin interpolymers suitable for use in the polymeric composition of the invention may be characterized by a melting point, Tm, which is higher than the melting point of a random copolymer having the same density, d. For example, the ethylene/α-olefin interpolymers may have at least one melting point, Tm, in degrees Celsius and density, d, in grams/cubic centimeter, wherein the numerical values of the variables correspond to the relationship: TM1000(d)−800, and preferably Tm≥2002.9+4538.5 (d)−2422.2(d)$^2$, and more preferably Tm≥6288.1+13141 (d)−6720.3(d)$^2$, and most preferably Tm≥858.91−1825.3 (d)+1112.8(d)$^2$. Preferably, the ethylene/α-olefin interpolymers suitable for use in the polymeric composition of the invention have a Mw/Mn from about 1.7 to about 3.5 and at least one melting point, Tm, in degrees Celsius and density, d, in grams/cubic centimeter, wherein the numerical values of the variables correspond to the relationship: Tm≥1000(d)−800, and preferably Tm>−2002.9+4538.5(d)−2422.2(d)$^2$, and more preferably Tm≥6288.1+13141(d)−6720.3(d)$^2$, and most preferably Tm≥858.91−1825.3(d)+1112.8(d)$^2$.

Examples of olefinic elastomers that may be employed include ENGAGE™ polyolefin elastomers (commercially available from DOW CHEMICAL CO.), VERSIFY™ polyolefin plastomers and polyolefin elastomers (commercially available from DOW CHEMICAL CO.), AFFINITY™ polyolefin elastomers (commercially available from DOW CHEMICAL CO.), INFUSE™ olefin block copolymers (commercially available from DOW CHEMICAL CO.), EXACT™ plastomer (commercially available from EXXONMOBIL CHEMICAL CO.), and VISTAMAXX™ propylene-based elastomers (commercially available from EXXONMOBIL CHEMICAL CO.).

Polyester

Preferred compositions include one or more polyesters. When used in a composition in combination with the carbonate polymer, olefinic elastomer, and compatibilizing agent (and preferably further including a silicon rubber), the use of a polyester may further improve the chemical resistance of the composition (e.g., resistance to medium chain triglycerides). The polyester may be a homopolymer or a copolymer. Suitable polyesters are semi-crystalline and have a crystallinity greater than about 3%. Preferred polyesters have a crystallinity of about 80% or less, more preferably about 60% or less, and most preferably about 40% or less.

Preferred polyesters are based on terephthalic acid. The polyester may be a polymerization reaction product of terephthalic acid and an alkyl glycol, such as ethylene glycol or butylenes glycol. The acid used for the polymerization may include terephthalic acid, may consist substantially of terephthalic acid, or may consist entirely of terephthalic acid. For example, the polyester may include a mixture of two or more acids (e.g., two or more diacids), such as a mixture of terephthalic acid and isophthalic acid. If employed in combination with terepthalic acid, the concentration of isophtahlic acid preferably is about 40 mole % or less, more preferably about 10 mole % or less, and most preferably about 3 mole % or less, based on the total amount of acid in the polyester. The amount of isophthalic acid may be about mole % or more, about 0.3 mole % or more, about 0.6 mole % or more, or about 1.0 mole % or more, based on the total amount of acid in the polyester. Without limitation the polyester may include, consist essentially of, or consist entirely of polyethylene terephthalate, polybutylene terephthalate, or both. Preferably the polyester includes, consists essentially of, or consists entirely of polyethylene terephthalate. The polyester (e.g., the polyethylene terephthalate and/or the polybutylene terephthalate) may be a homopolymer or copolymer. Preferred copolymers include two or more acids, include two or more alcohols, or both. The polyester preferably includes about 60 mole % or more, more preferably about 90 mole % or more, even more preferably about 97 mole % or more terephthalic acid, based on the total number of diacid in the polyester. The polyester may includes about 100% or less, about 99.7% or less, about 99.4% or less, or about 99.0% or less terephthalic acid, based on the total number of diacids in the polyester. Preferred polyethylene terephthalates include about 80 mole % or more, about 90 mole % or more, or about 97 mole % or more ethylene glycol, based on the total number of dialcohols in the polyethtylene terephthalate. Such polymers may include a concentration of ethylene glycol of about 100 mole % or less, about 99 mole % or less, or about 98 mole % or less.

Preferred polyesters (e.g., preferred polyethylene terephthalates) have an intrinsic viscosity of about 0.5 or more, more preferably about 0.6 or more, even more preferably about 0.65 or more, and most preferably about 0.70 or more. Preferred polyesters (e.g., preferred polyehthylene terephthalates) have an intrinsic viscosity of about 1.5 or less, more preferably about 1.0 or less, even more preferably about 0.95 or less, and most preferably about 0.92 or less. The intrinsic viscosity of the polyester may be measured in 1% solution in dichloroacetic acid. Preferred polyesters (e.g., preferred polyethylene terephthalates) have a concentration of carboxylic acid end groups of about 300 meq/kg or less, more preferably about 100 meq/kg or less, and most preferably about 40 meq/kg or less. The amount of carboxylic acid end groups may be about 0 meq/kg or more, about 10 meq/kg or more, or about 20 meq/kg or more. The concentration of carboxylic acid end groups may be determined using potentiometric titration in o/m cresol. The concentration of diethylene glycol in the polyester preferably is about 4 wt. % or less, more preferably about 2 wt. % or less, and most preferably about 1 wt. % or less, based on the total weight of the polyester. The concentration of diethylene glycol in the polyester may be about 0 wt. % or more, about 0.1 wt. % or more, about 0.3 wt. % or more, or about 0.4 wt. % or more, based on the total weight of the polyester.

Preferred compositions include one or more polyesters. The concentration of the polyester (e.g., the concentration of the polyethylene terephthalate) preferably is about 10 weight percent or more, more preferably about 20 weight percent or more, even more preferably about 25 weight percent or more, and most preferably about 30 weight percent or more, based on the total weight of the composition. The concentration of the polyester (e.g., the concentration of polyethylene terephthalate) preferably is about 45 weight percent or less, more preferably about 40 weight percent or less, based on the total weight of the composition.

The composition preferably includes a high concentration of the carbonate polymer relative to the concentration of the polyester. For example, the ratio of the carbonate polymer to the polyester may be about 1.0 or more, preferably about 1.2 or more, and more preferably about 1.4 or more.

The one or more polyesters may optionally include polybutylene terephthalate. If employed, the amount of polybutylene terephthalate preferably is about 10 weight percent or less, more preferably about 5 weight percent or less, even more preferably about 3 weight percent or less, and most preferably about 1 weight percent or less, based on the total weight of the composition. The amount of polybutylene terephthalate may be about 0 weight percent or more, or about 0.5 weight percent or more, based on the total weight of the composition. It will be appreciated that the composition may be substantially free of, or even entirely free of polybutylene terephthalate.

The total concentration of the polycarbonate and the polyester preferably is about 40 weight percent or more, more preferably about 50 weight percent or more, even more preferably about 75 weight percent or more, even more preferably about 80 weight percent or more, and most preferably about 85 weight percent or more, based on the total weight of the polymer in the polycarbonate blend composition and/or based on the total weight of the polycarbonate blend composition. The total concentration of the polycarbonate and the polyester preferably is 98 weight percent or less, more preferably about 97 weight percent or less, even more preferably about 96 weight percent or less, and most preferably about 95 weight percent or less, based on the total weight of the polymer in the polycarbonate blend composition and/or based on the total weight of the polycarbonate blend composition.

An example of a commercially available polyester according to the teachings herein is TRAYTUF® 8906 brand polyester resin which is a polyethylene terephthalate having an intrinsic viscosity of about 0.89 dl/g and a melting temperature of about 254° C. and available from M&G Polymers USA, LLC. Other examples of commercially available polyesters useful according to the teachings herein include PET T49H polyethylene terephthalate having an intrinsic viscosity of about 0.85, PET F024 polyethylene terephthalate having an intrinsic viscosity of about 0.90, and PET F019 having an intrinsic viscosity of about 0.89, all commercially available from INVISTA RESINS & FIBERS GMBH.

Silicon-Containing Rubber

In a preferred aspect of the invention, the composition includes one or more silicon-containing rubbers (i.e., a rubber containing silicon atoms). Preferred silicon-containing rubbers include silicone rubbers, such as silicone rubbers having one or more siloxanes. The silicone rubber may have a backbone include, consists essentially of, or consisting entirely of one or more siloxane groups having the following structure: —(SiR$^1$R$^2$-0)-, where R$^1$ and R$^2$ are each independently selected from the group consisting of an alkyl having 1 to 12 carbon atoms, hydrogen, and an aryl group having 1 to 12 carbon atoms. The silicone rubber may be include one or more grafts. Preferred grafts include monomers, oligomers, or polymers capable of: reducing the surface tension between the silicone rubber and the carbonate polymer; reducing the surface tension between the silicone rubber and the polyester; reacting with the carbonate polymer; reacting with the polyester; or any combination thereof. For example, the silicone rubber may be a silicone-acrylic rubber, such as a core-shell polymer including a silicone core and an acrylic shell. By way of example, suitable silicone-acrylic rubbers commercially available from Mitsubishi Rayon under the name METABLEN S (e.g., METABLEN S2200).

Preferred compositions include a silicon-containing rubber (e.g., a silicone-acrylic rubber) at a concentration of about 0.1 weight percent or more, more preferably about 1 weight percent or more, even more preferably about 2 weight percent or more, and most preferably about 4 weight percent or more, based on the total weight of the composition. The amount of the silicon-containing rubber typically is limited due to discoloration and/or cost considerations. The composition preferably includes the silicon-containing rubber (e.g., the silicone-acrylic rubber) at a concentration of about 20 weight percent or less, more preferably about 15 weight percent or less, and most preferably about 12 weight percent or less.

Additives

The polymeric blend compositions herein may further include any of a variety of art-disclosed additives. By way of example, it is possible to include one or any combination of lubricants, mold release, stabilizers (e.g., anti-oxidants, thermal stabilizers, light (e.g., IR, UV or both) stabilizers or any combination thereof), dyes, pigments, process aids, flame retardants, organic or inorganic fillers or fibers, plasticizers, or the like, in their respective art-disclosed quantities. Preferably, the polymeric blend compositions will include a lubricant, a stabilizer, or both. Preferred additives include those carbonate polymer containing compositions (e.g., compositions including about 80 weight percent or more polycarbonate) and those employed in polyester polymer compositions (e.g., compositions including about 80 weight percent or more polyethylene terephthalate). Preferably, the amount of the additive should be sufficient to provide the intended effect. By way of example, the amount of antioxidant should be sufficient to prevent or reduce oxidation during processing the composition into at least a portion of an article and/or during the life cycle of the article.

Examples of additives include commercially available stabilizers available from BASF Chemical Co, such as IRGANOX® antioxidants and IRGAFOS® process stabilizers, and UVINUL® light stabilizers, Particularly preferred additives include IRGANOX® 1076 (CAS No. 2082-79-3; Octadecyl 3,5-di(tert)-butyl-4-hydroxyhydrocinnamate) and UVINUL® 3030 (CAS NO. 178671-58-4; Pentaerythritol tetrakis(2-cyano-3,3-diphenylacrylate).

Preferred concentration of the additives is about 0.05 wt. % or more (e.g., about 0.10 wt. % or more, or about 0.15 wt. % or more). The concentration of the additive preferably is about 10 wt. % or less, about 4 wt. % or less, or about 1 wt. % or less).

The composition according to the teachings herein preferably consist essentially of or consist entirely of the carbonate polymer, the compatibilizing agent, the olefinic elastomer, any polyester, any silicone elastomer, any additives, and any fillers. For example the total concentration of the carbonate polymer, the compatibilizing agent, the olefinic elastomer, any polyester, any silicone elastomer, any additives, and any fillers preferably is about 90 weight percent or more, more preferably 95 weight percent or more, and most preferably 98 weight percent or more, or even about 100 weight percent, based on the total weight of the composition.

The compositions according to the teachings herein may be employed in articles, components and devices that may contact triglycerides (e.g., medium chain triglycerides), such as medical devices, and/or materials that include triglycerides. For example, the compositions may be employed in storing, manufacture, or use of pharmaceuticals containing such triglycerides.

Preferred compositions are substantially free of, or entirely free of styrene-containing graft copolymers. For example, the amount of any styrene-containing graft copolymer preferably is about 5 weight percent or less, about 3 weight percent or less, about 2 weight percent or less, about 1.5 weight percent or less, or about 1 weight percent or less, based on the total weight of the styrene graft copolymer and the carbonate polymer.

Environmental resistance to a chemical (e.g., test fluid) is measured using specimen suitable for tensile testing according to ISO 527-2/50. The specimen is pre-strained with a 1% strain and immersed in the chemical for 72 hours. The specimen is then removed and tested according to ISO 527-2/50. Specimen that have not been exposed to the chemical are also tested. The tensile strength at yield, the tensile strength at failure, the tensile modulus, the elongation at yield and the elongation at failure are measured for both the specimen exposed to the chemical and the specimen that is not exposed to the chemical. The % retention is determined by taking the ratio of the value of a property of the specimen exposed to the chemical to the value of the same property for the specimen that was not exposed to the chemical and multiplying by 100%. Compositions having poor environmental resistance may break in the tensile jig prior to testing or may have low % retention in the mechanical property. Preferred compositions do not break prior to tensile testing and have generally high retention in the aforementioned mechanical properties. For example, the % retention in one or any combination of the aforementioned mechanical properties may be about 70% or more, preferably about 80% or more, more preferably about 90% or more, and most preferably about 95% or more. The % retention of one or any combination of the aforementioned mechanical properties (tensile strength at yield, tensile strength at failure, tensile modulus, elongation at yield, and elongation at failure) preferably is about 150% or less, about 130% or less, about 120% or less, or about 110% or less). Examples of test fluids include triglycerides (e.g., medium chain triglycerides), alcohols (e.g., alcohols including 70% isopropyl alcohol and 30% water), Calvicide, bleach (e.g., 50% bleach solution in water), Cidex plus, and the like. Preferred compositions have good resistance to medium chain triglycerides. For example, the composition may have good resistance to medium chain triglycerides as well as good resistance to one or more cleaning and disinfecting fluids, typically used in hospital settings, selected from the group consisting of 70% isopropyl alcohol, Clavicide, 50% bleach, and Cidex plus. Preferably, the polycarbonate blend composition has good resistance to disinfectant cleaners (e.g., disinfectant cleaners containing quaternary ammonia) such as VIREX® Tb grade disinfectant cleaner (COMMERCIALLY AVAILABLE from DIVERSEY, INC. of Wisconsin. More preferably, the composition has good resistance to both medium chain triglycerides and to disinfectant cleaners including quarternary ammonia (e.g., VIREX® Tb). The composition may further be resistant to etoposides (e.g., to Veposid), to Pacitaxel, to N,N-dimethylacetamide containing solutions (e.g., Busulfex with N,N-dimethylacetamide solvent), to dimethyl sulfoxide (e.g., RIMSO-50) or any combination thereof. Therefore, the composition has a particularly useful application in exterior housings associated with medical devices.

The compositions according to the teachings herein may be prepared as an admixture including all of the components of the composition. As such, the composition may be provide as an admixture including all of the components (e.g., in the form of polymer pellets) suitable for processing in typical polymer forming equipment such as employed in an extrusion process (profile extrusion, sheet extrusion, or otherwise), in a molding process, in blow molding process, in a thermoforming process, or any combination thereof. It will be appreciated that the components may be provided in two or more different materials, such as in a dry blend of two or more different materials, where the final composition is prepared in a melt blending step, such as a melt blending step employing a screw and barrel assembly. For example, the melt blending step may be in an extrusion process, a blow molding process, or an injection molding process. By way of illustration, pellets of a carbonate polymer may be fed into a part shaping machine having a screw and barrel assembly along with pellets of an admixture including the other components (and optionally including a portion of the carbonate polymer) of the composition. As such, the final composition may be first achieved during melting and blending in the screw and barrel assembly of the part shaping machine as the pellets of the two or more different materials move along the screw and barrel assembly.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

EXAMPLES

Example 1 is prepared by melt blending a linear polycarbonate of bisphenol A having a melt flow rate of about 10 g/10 min as measured according to ISO 1133 at 300° C./1.2 kg, with IRGANOX® 1076 antioxidant and UVINUL® 3030 stabilizer as shown in Table 1. The composition was formed in to plaques having a thickness of about 2 mm. Tensile specimen are prepared from the plaques for testing according to ISO 527-2/50. Ten of the specimen are pre-strained with a bending strain of 1% and immersed in MCT-A medium chain triglyceride fluid for 3 days. After 3 days, the immersed specimens are removed from the fluid and tested according to ISO 527-2/50. Specimens that have not been exposed to the fluid are also tested. The tensile test results are shown in Table 1.

MCT-A is a medium chain triglyceride from CRAYHON RESEARCH as ULTRA PURE MCT OIL and is based on coconut. The concentration of caproic acid (C6) is 2% max, caprylic acid (C8) is 65-80%, capric acid (C10) is 23-33%, and C12 or above is 2.5% max. The concentration of C8-C10 is 95% min.

Example 2 is prepared and tested using the same process as Example 1, except the composition also includes VERSIFY™ 3401 and AMPLIFY™ EA 101, both commercially available from DOW CHEMICAL CO. The composition and tensile properties are shown in Table 1.

Example 3 is prepared and tested using the same process as Example 1, except the composition also includes TRAYTUF® 8906 polyethylene terephthalate and METABLEN® S2200 silicone-acrylic rubber (which is a core-shell rubber). The composition and tensile properties are shown in Table 1.

Example 4 is prepared and tested using the same process as Example 1, except the composition also includes VERSIFY™ 3401 and AMPLIFY™ EA 101, both commercially available from DOW CHEMICAL CO, and further include TRAYTUF® 8906 polyethylene terephthalate and METABLEN® S2200 silicone-acrylic rubber (which is a core-shell rubber). The composition and tensile properties are shown in Table 1.

Example 5 is prepared and tested using the same process as Example 3, except the concentration of the polycarbonate is decreased and the concentration of the silicone-acrylic rubber is increased. The composition and tensile properties are shown in Table 1.

Example 6 is prepared and tested using the same process as Example 4, except the concentration of the polycarbonate is decreased and the concentration of the silicone-acrylic rubber is increased. The composition and tensile properties are shown in Table 1.

Example 6 is also tested for environmental stress cracking resistance in VIREX® Tb grade disinfectant cleaner, commercially available from DIVERSEY, INC that includes quarternary ammonia. VIREX® Tb is a disinfect cleaner including diethylene glycol butyl ether (5-10 wt. %), n-alkyl dimethyl benzyl ammonium chloride (0.1-1.5 wt. %), and n-alkyl dimethyl ethylbenzyl ammonium chloride (0.1-1.5 wt. %). VIREX® Tb has a pH of about 12.2 and a specific gravity of about 1.012. The samples are prestrained at 1% and immersed in the fluid for 3 days. Measurements are made on two sets of samples with the following results: tensile yield: 46.3 and 47.0 MPa; tensile strength at failure: 49.3 and 50.8 MPa, elongation at yield: 4.5 and 4.6%, elongation at failure: 161% and 175%, tensile modulus: 1945 and 1960 MPa, percent of samples breaking prior to testing: 0% and 0%. This material has good resistance to VIREX® Tb.

ESCR resistance of Example 6 is measured in Cavicide fluid. Samples are prestrained at 1% bending and immersed for 72 hours. Mechanical testing of the samples results in the following measurements: tensile yield: 46.2 MPa; tensile strength at failure: 48.3 MPa, elongation at yield: 4.7%, elongation at failure: 167%, tensile modulus: 1975 MPa, and percent of samples breaking prior to testing: 0%. This material has good resistance to Cavicide.

more α-olefins and has a crystallinity of less than 30 percent, wherein the total concentration of two or more α-olefins of the olefinic elastomer is from 95 weight percent to 100 weight percent based on the total weight of the olefinic elastomer; and wherein the compatibilizing agent is selected from the group consisting of a copolymer consisting essentially of an acrylate monomer and one or more α-olefins, a copolymer consisting essentially of acrylic acid monomer and one or more α-olefins, an oxazoline functional olefin, a copolymer consisting essentially of one or more alkylacrylic acid monomers and one or more α-olefins, a copolymer of maleic anhydride and one or more α-olefins, and a graft polymer having a backbone consisting essentially of, or consisting entirely of one or more α-olefins and a functional graft;

wherein the functional graft is a maleic anhydride, an acrylate, an acrylic acid, an oxazoline, or any combination thereof;

wherein the total concentration of the olefins in the compatibilizing agent is from about 10 weight percent to less than 95 weight percent based on the total weight of the compatibilizing agent; and wherein the total concentration of the carbonate polymer, the compatibilizing agent, the olefinic elastomer, any polyester, any silicone elastomer, and any additives is more than 95 weight percent, based on the total weight of the composition.

TABLE 1

| Example | | 1 | 2 | 3 | 4 | 5 | 6 |
|---|---|---|---|---|---|---|---|
| Polycarbonate | Wt. % | 99.65 | 96.15 | 59.65 | 56.30 | 55.65 | 52.35 |
| Versify 3401 | Wt. % | | 2.40 | | 2.40 | | 2.40 |
| Amplify EA 101 | Wt. % | | 1.10 | | 1.10 | | 1.10 |
| Antioxidant | Wt. % | 0.20 | 0.20 | 0.20 | 0.20 | 0.20 | 0.20 |
| Light stabilizer | Wt. % | 0.15 | 0.15 | 0.15 | 0.15 | 0.15 | 0.15 |
| PET | Wt. % | | | 35.00 | 35.00 | 35.00 | 35.00 |
| Metablen S2200 | Wt. % | | | 5.00 | 5.00 | 9.00 | 9.00 |
| Total | Wt. % | 100.0 | 100.00 | 100.00 | 100.15 | 100.00 | 100.15 |
| Initial Properties (not exposed to fluid) | | | | | | | |
| Tensile Yield | MPa | 60.5 | 54.3 | 57.5 | 52.2 | 51.5 | 48.5 |
| Tensile Strength at failure | MPa | 63.9 | 54.7 | 51.6 | 51.6 | 49.4 | 48.4 |
| Elongation at Yield | % | 6 | 5.9 | 5 | 4.9 | 4.8 | 4.8 |
| Elongation at Failure | % | 98 | 108 | 128 | 165 | 109 | 105 |
| Tensile Modulus | MPa | 2265 | 2175 | 2325 | 2130 | 2115 | 1980 |
| Properties after exposure to MCT fluid for 3 days with a pre-strain of 1% | | | | | | | |
| Tensile Yield | MPa | 60.5 | 54.1 | 32.1 | 52.4 | 25.3 | 44.5 |
| Tensile Strength at failure | MPa | 63.9 | 63 | 32.1 | 53.4 | 23.2 | 45.3 |
| Elongation at Yield | % | 6 | 5.9 | 1 | 4.9 | 4.6 | 4.4 |
| Elongation at Failure | % | 95 | 101 | 1 | 170 | 99 | 87 |
| Tensile Modulus | MPa | 2305 | 2165 | 2295 | 2155 | 1065 | 2010 |
| Percent of samples breaking prior to testing | | 40% | 0% | 0% | 0% | 50% | 0% |

What is claimed is:

1. A composition comprising a blend of a plurality of polymers including:
   a. from about 40 weight percent to about 98 weight percent of one or more carbonate polymers;
   b. from about 0.1 weight percent to about 10 weight percent of one or more compatibilizing agent including one or more olefins; and
   c. from about 0.1 weight percent to about 10 weight percent of one or more olefinic elastomers, wherein the olefinic elastomer is a copolymer including two or 2. The composition of claim 1, wherein
   the composition includes from about 10 weight percent to about 45 weight percent of one or more polyesters, the concentration of the carbonate polymer is about 70 weight percent or less, and the combined concentration of the polyester and the carbonate polymer is from about 75 weight percent to about 98 weight percent based on the total weight of the composition.

3. The composition of claim 2, wherein the combined concentration of the polyester and the carbonate polymer is from about 85 weight percent to about 95 weight percent, based on the total weight of the composition.

4. The composition of claim 3, wherein the composition includes a silicon-containing rubber at a concentration from about 0.1 to about 20 weight percent based on the total weight of the composition.

5. The composition of claim 1, wherein
the one or more additives includes one or more fillers; and
the olefinic elastomer has a crystallinity greater than 2 percent and less than about 20 percent.

6. The composition of claim 2, wherein the olefinic elastomer is a random copolymer including ethylene and propylene, wherein the concentration of propylene is from about 80 weight percent to about 95 weight percent, and the concentration of ethylene is from about 5 weight percent to about 20 weight percent, based on the total weight of the olefinic elastomer.

7. The composition of claim 6, wherein the olefinic elastomer has a total concentration of ethylene and propylene from about 97 weight percent to about 100 weight percent, based on the total weight of the olefinic elastomer.

8. The composition of claim 1, wherein the one or more α-olefins of the compatibilizing agent includes one or more α-olefin having 2 through 8 carbon atoms.

9. The composition of claim 8, wherein the compatibilizing agent is a copolymer including one or more α-olefins and one or more alkyl acrylates, wherein the concentration of the one or more α-olefins is from about 10 weight percent to about 90 weight percent, based on the total weight of the compatibilizing agent.

10. The composition of claim 9, wherein the one or more alkyl acrylates is present at a concentration of from about 10 weight percent to about 90 weight percent, based on the total weight of the compatibilizing agent; and the compatibilizing agent includes about 70 weight percent or more ethylene.

11. The composition of claim 9, wherein the compatibilizing agent is a copolymer of ethylene and ethyl acrylate, wherein the total concentration of ethylene and ethyl acrylate is from about 95 weight percent to about 100 weight percent based on the total weight of the compatibilizing agent.

12. The composition of claim 1, wherein the compatibilizing agent has a melt index of about 0.5 to 40 g/10 min, as measured according to ASTM ISO 1133 at 190° C./2.16 kg, and the compatibilizing agent has a melting temperature from about 50° C. to about 108° C.

13. The composition of claim 1, wherein the carbonate polymer includes a polycarbonate of bisphenol-A.

14. The composition of claim 2, wherein the plurality of polymers includes the carbonate polymer, the olefinic elastomer, the compatibilizing agent and the polyester, and wherein the concentration of the carbonate polymer is about 40 weight percent or more, the concentration of the compatibilizing agent is about 0.2 weight percent or more, and the concentration of the olefinic elastomer is about 0.2 weight percent or more, based on the total weight of the plurality of polymers.

15. A composition comprising a blend of a plurality of polymers including:
a. from about 40 weight percent to about 98 weight percent of one or more carbonate polymers;
b. from about 0.1 weight percent to about 10 weight percent of one or more compatibilizing agent including one or more olefins; and
c. from about 0.1 weight percent to about 10 weight percent of one or more olefinic elastomers, wherein the olefinic elastomer is a copolymer including two or more α-olefins and has a crystallinity of less than 30 percent, wherein the total concentration of two or more α-olefins of the olefinic elastomer is from 95 weight percent to 100 weight percent based on the total weight of the olefinic elastomer; and
wherein the compatibilizing agent is selected from the group consisting of a copolymer including or consisting essentially of an acrylate monomer and one or more α-olefins, a copolymer including or consisting essentially of acrylic acid monomer and one or more α-olefins, an oxazoline functional olefin, a copolymer including or consisting essentially of one or more alkylacrylic acid monomers and one or more α-olefins, a copolymer or terpolymer including or consisting essentially of glycidiyl methacrylate and an α-olefin, a copolymer including maleic anhydride and one or more α-olefins, and a graft polymer having a backbone including, consisting essentially of, or consisting entirely of one or more α-olefins and a functional graft;
wherein the functional graft is a maleic anhydride, an acrylate, an acrylic acid, an oxazoline, a glycidyl methacrylate, or any combination thereof;
wherein the total concentration of the olefins in the compatibilizing agent is from about 10 weight percent to less than 95 weight percent based on the total weight of the compatibilizing agent; and
wherein the total concentration of the carbonate polymer, the compatibilizing agent, the olefinic elastomer, any polyester, any silicone elastomer, and any additives is more than 95 weight percent, based on the total weight of the composition;
wherein the composition is resistant to hospital grade tuberculosis disinfectants.

16. The composition of claim 1, wherein the composition includes the polyester.

17. A method comprising a step of contacting a surface of an article with a hospital grade tuberculosis disinfectant, wherein the article is formed of the composition of claim 15.

18. A method comprising a step of contacting a surface of an article with a hospital grade tuberculosis disinfectant, wherein the article is formed of the composition of claim 2.

19. A composition comprising a blend of a plurality of polymers including:
a. from about 40 weight percent to about 98 weight percent of one or more carbonate polymers;
b. from about 0.1 weight percent to about 10 weight percent of one or more compatibilizing agent including one or more olefins;
c. from about 0.1 weight percent to about 10 weight percent of one or more olefinic elastomers, wherein the olefinic elastomer is a copolymer including two or more α-olefins and has a crystallinity of less than 30 percent, wherein the total concentration of two or more α-olefins of the olefinic elastomer is from 95 weight percent to 100 weight percent based on the total weight of the olefinic elastomer;
d. up to 4 weight percent of one or more additives; and
e. from about 0.1 to 20 weight percent of a silicon-containing rubber, based on the total weight of the composition;
wherein the compatibilizing agent is selected from the group consisting of a copolymer consisting essentially of an acrylate monomer and one or more α-olefins, a copolymer consisting essentially of acrylic acid monomer and one or more α-olefins, an oxazoline functional olefin, a copolymer consisting essentially of one or more alkylacrylic acid monomers and one or more α-olefins, a copolymer of maleic anhydride and one or more α-olefins, and a graft polymer having a backbone consisting essentially of, or consisting entirely of one or more α-olefins and a functional graft;

wherein the weight ratio of the one or more carbonate polymers to the compatibilizing agent is about 20 or more, and the weight ratio of the one or more carbonate polymers to the olefinic elastomer is about 15 or more; and wherein the total concentration of the carbonate polymer, the compatibilizing agent, the olefinic elastomer, the silicone elastomer, and the one or more additives is more than 95 weight percent, based on the total weight of the composition.

20. The composition of claim 19, wherein
the olefinic elastomer has a crystallinity greater than 2 percent and less than about 20 percent.

* * * * *